3,198,839
PROCESS FOR THE PREPARATION OF MERCAPTANS

Charles Yvan Philippe Lalet, Caen, Calvados, France, assignor to Société Anonyme dite: Societe Nationale des Petroles d'Aquitaine, Paris, France, a company of France
No Drawing. Filed Oct. 5, 1962, Ser. No. 228,723
13 Claims. (Cl. 260—609)

The present application is a continuation-in-part of copending applications Serial No. 128,354, filed August 1, 1961, and Serial No. 128,367, filed August 1, 1961, that are now both abandoned.

This invention relates to a process for the preparation of mercaptans, and more particularly to an improved method of forming mercaptans from oxygen-containing organic compounds.

It is known that mercaptans can be obtained by the reaction of sulphur and hydrogen with oxygen-containing organic compounds, such as carboxylic acids, alcohols, aldehydes and ketones, in the presence of a catalyst; in the case of acids the reaction takes place as follows:

$$R—COOH+S+3H_2 \rightarrow R—CH_2—SH+2H_2O$$

It is also known that hydrogen sulphide can be used in this reaction in place of the suphur, in the presence, if desired, of hydrogen; in the case of acids the reaction takes place as follows:

$$R—COOH+H_2S+2H_2 \rightarrow R—CH_2—SH+2H_2O$$

Moreover other compounds, such as carbon disulphide, calcium sulphide and ammonium sulphide, can be employed as sources of sulphur in this reaction.

The sulphides of molybdenum, tungsten, cobalt and copper have been employed as catalysts for this reaction but such catalysts have generally resulted in very low yields of the order of 20%.

Greater yields, of the order of 40%, can be obtained but only by operating at very elevated temperatures and pressures, substantially higher than 300° C. and 300 kg./cm.$^2$, respectively. Such high temperatures and pressures cannot, however, be used for many compounds without risk of decomposition and, in particular, cannot be used for the treatment of fatty acids which decompose at temperatures of the order of 300° C. to give hydrocarbons.

The sulphide of manganese has also been employed as a catalyst in the above reaction, but again high temperature and pressure are required.

In addition to the above-mentioned sulfide catalysts, it has been proposed to use a number of metal oxides as catalysts. For instance, vaporized lauryl alcohol which has been reacted with hydrogen sulfide in the gaseous phase at temperatures of from 200 to 400° C. in the presence of catalysts consisting of oxides such as alumina, thoria and zirconia. However, such a reaction gives very poor yields of the order of 11 to 12% with respect to the lauryl alcohol. This low yield is not only uneconomical but presents a particular problem with regard to the preparation of lauryl mercaptan since the molecular weights and boiling points of the mercaptan and the unreacted lauryl alcohol are extremely close making their separation very difficult.

It is, therefore, an object of the present invention to provide a new and improved method of forming mercaptans from oxygen-containing organic compounds, such as carboxylic acids, alcohols, aldehydes and ketones.

Another object of this invention is to provide a method of preparing mercaptans at a temperature low enough to minimize the risk of decomposing the compounds involved.

A further object of this invention is to provide a method of preparing mercaptans in which improved yields are obtained.

A still further object is to provide a method of converting lauryl alcohol to a mercaptan wherein the mercaptan contained is practically free of alcohol.

Further objects and modifications will become apparent from the following description and claims.

We have now found that very good yields of mercaptans, which are greater than those obtained hitherto, can be obtained while using relatively low temperatures and pressures which do not lead to decomposition of the starting materials or reaction products, by the use of a particular catalyst, namely rhenium heptasulphide.

According to the present invention, therefore, there is provided a process for the preparation of mercaptans by reacting an oxygen-containing organic compound with sulphur and hydrogen or with a sulphur containing compound, if necessary or desirable in the presence of hydrogen, in which the reaction is carried out in the presence of rhenium heptasulphide as catalyst. The presence of hydrogen during the reaction is often desirable to prevent the formation of excessive quantities of organic sulphide.

The reaction is preferably carried out under pressure with an excess of sulphur, or sulphur donor, and hydrogen, at a temperature from 170° to 300° C. In general, we have found that below 170° C. the reaction does not take place, while above 300° C. hydrogenolysis of the C—O and C—S bonds takes place with formation of the corresponding alkanes.

The best yields are obtained with temperatures of from 250° to 270° C. when the starting material is a carboxylic acid. When the starting material is an alcohol, very good yields are obtained with temperatures of from 170° C. to 240° C. with the best results being obtained within the temperature range of 170° to 220° C.

The following examples are given by way of illustration only and are not intended to in any way limit the scope of the invention:

EXAMPLES 1 TO 7

In these examples, various primary mercaptans were prepared by the reaction of fatty acids containing from 6 to 18 carbon atoms with sulphur and hydrogen, in the presence of rhenium heptasulphide as catalyst. The reaction in each case was carried out in a 1 litre stainless steel bomb under a pressure of 40–90 kg./cm.$^2$ at a temperature of from 250°–270° C. for from 4 to 7 hours. The reactants were used in the following proportions:

Fatty acid _____ 1 gram molecule.
Sulphur _____ 3 gram atoms.
Hydrogen _____ 5–6 gram molecules.
Rhenium heptasulphide ___ 1.5 g. per 50 g. of fatty acid.

At the end of the reaction, ethyl ether was added to the contents of the bomb and the mixture was filtered. The catalyst was recovered and could be re-used. The water present in the filtrate was decanted and the organic phase was washed several times with a dilute aqueous solution of potassium or ammonium carbonate to eliminate unreacted fatty acid, and then with water to neutrality, and finally dried over anhydrous sodium sulphate; the ether was evaporated off and the mercaptan formed was distilled.

In Table I which follows are set out the conditions of temperature, pressure and others used in the preparation of the various specified primary mercaptans.

*Table I*

| Ex. | Reactants used | | Temp., °C. | Pressure (kg./cm.²) | | Time (hrs.) | Mercaptan | Yield, percent |
|---|---|---|---|---|---|---|---|---|
| | | | | Cold | Maximum | | | |
| 1 | Caproic acid, g | 20 | 250 | 40 | 80 | 4 | Hexyl | 50 |
| | Sulphur, g | 26 | | | | | | |
| | Hydrogen, l | 40 | | | | | | |
| | Catalyst, g | 1.5 | | | | | | |
| 2 | Caprylic acid, g | 40 | 250 | 40 | 70 | 4 | Octyl | 57 |
| | Sulphur, g | 32 | | | | | | |
| | Hydrogen, l | 40 | | | | | | |
| | Catalyst, g | 1.5 | | | | | | |
| 3 | Capric acid, g | 50 | 250 | 40 | 75 | 4 | Decyl | 50 |
| | Sulphur, g | 40 | | | | | | |
| | Hydrogen, l | 40 | | | | | | |
| | Catalyst, g | 1.5 | | | | | | |
| 4 | Lauric acid, g | 50 | 250 | 45 | 75 | 5 | Dodecyl | 50 |
| | Sulphur, g | 24 | | | | | | |
| | Hydrogen, l | 45 | | | | | | |
| | Catalyst, g | 1.5 | | | | | | |
| 5 | Myristic acid, g | 57 | 270 | 45 | 90 | 5 | Tetradecyl | 58 |
| | Sulphur, g | 32 | | | | | | |
| | Hydrogen, l | 45 | | | | | | |
| | Catalyst, g | 1.5 | | | | | | |
| 6 | Palmitic acid, g | 50 | 270 | 40 | 85 | 5 | Hexadecyl | 50 |
| | Sulphur, g | 30 | | | | | | |
| | Hydrogen, l | 40 | | | | | | |
| | Catalyst, g | 1.5 | | | | | | |
| 7 | Stearic acid, g | 70 | 260 | 45 | 80 | 7 | Octadecyl | 57 |
| | Sulphur, g | 32 | | | | | | |
| | Hydrogen, l | 45 | | | | | | |
| | Catalyst, g | 1.5 | | | | | | |

The purity of mercaptan product obtained (expressed as percent RSH) was determined by iodometric determination.

The mercaptans obtained were identified by forming (a) the characteristic crystalline 2,4-dinitro-(alkylthio)-benzene derivatives by reaction of the mercaptans with 2,4-dinitro-chlorobenzene in alcoholic medium and in the presence of a base such as NaOH, and (b) the characteristic crystalline alkyl-(2,4-dinitrophenyl)-sulphone derivatives by oxidation of the 2,4-dinitro-(alkylthio)-benzenes with potassium permanganate in an acetic acid medium.

In Table II which follows are set out the physical characteristics of the mercaptans obtained, that is their boiling points, the refractive indices ($n_D^{20}$), and their purity (percent RSH). The characteristics of the crystalline derivatives of these mercaptans are set out in Table III.

*Table II*

| Ex. | Starting acid | Mercaptan obtained | B.P., °C./mm. Hg | $n_D^{20}$ | Purity, percent RSH |
|---|---|---|---|---|---|
| 1 | Caproic | Hexyl | 147-153/760 | 1.4490 | 80 |
| 2 | Caprylic | Octyl | 83-4/16 | 1.4535 | 91 |
| 3 | Capric | Decyl | 115-120/15 | 1.4560 | 87.5 |
| 4 | Lauric | Dodecyl | 98-9/1 | 1.4580 | 87.5 |
| 5 | Myristic | Tetradecyl | 118/0.5 | 1.4605 | 83.5 |
| 6 | Palmitic | Hexadecyl | 125-130/0.5 | | 75.7 |
| 7 | Stearic | Octadecyl | 144-5/0.4 | | 71 |

EXAMPLES 8 to 14

Various primary mercaptans were prepared by the reaction of fatty acids containing from 6 to 18 carbon atoms with hydrogen sulphide and hydrogen in the presence of rhenium heptasulphide as catalyst. Solid hydrogen sulphide was used, obtained by condensation of the gas and solidification in a Pyrex tube immersed in liquid nitrogen.

The reaction, in each case, was carried out in a 1 litre stainless steel bomb under a pressure of 40 to 140 kg./cm.² at a temperature of from 250° to 270° C. for from 3½ to 4½ hours. The reactants were used in the following proportions:

Fatty acid _____ 1 gram molecule.
Hydrogen sulphide _____ 3 gram molecules.
Hydrogen _____ 2-3 gram molecules.
Catalyst _____ 1.5 g. per 50 g. of fatty acid.

*Table III*

| Ex. | Starting acid | 2,4-dinitro(alkylthio)benzene | | | | | Alkyl(2,4-dinitrophenyl)sulphone | | | | | |
|---|---|---|---|---|---|---|---|---|---|---|---|---|
| | | M.P., °C. | Empirical formula | Analysis | | | | M.P., °C. | Empirical formula | Analysis | | | |
| | | | | C, percent | | H, percent | | | | C, percent | | H, percent | |
| | | | | Calc. | Found | Calc. | Found | | | Calc. | Found | Calc. | Found |
| 1 | Caproic | [1] 73 | $C_{12}H_{16}N_2O_4S$ | 50.69 | 50.72 | 5.66 | 5.71 | [2] 97 | $C_{12}H_{16}N_2O_6S$ | 45.66 | 45.53 | 5.09 | 5.03 |
| 2 | Caprylic | 78 | $C_{14}H_{20}N_2O_4S$ | 53.83 | 54.04 | 6.44 | 6.46 | 98 | $C_{14}H_{20}N_2O_6S$ | 48.83 | 49 | 5.85 | 5.73 |
| 3 | Capric | 84 | $C_{16}H_{24}N_2O_4S$ | 56.45 | 56.55 | 7.10 | 6.98 | 92 | $C_{16}H_{24}N_2O_6S$ | 51.59 | 51.71 | 6.49 | 6.34 |
| 4 | Lauric | 89 | $C_{18}H_{28}N_2O_4S$ | 58.68 | 58.87 | 7.66 | 7.69 | 100 | $C_{18}H_{28}N_2O_6S$ | 53.99 | 53.93 | 7.05 | 7.08 |
| 5 | Myristic | 93-94 | $C_{20}H_{32}N_2O_4S$ | 60.57 | 60.76 | 8.13 | 7.99 | 104 | $C_{20}H_{32}N_2O_6S$ | 56.06 | 56.12 | 8.52 | 7.35 |
| 6 | Palmitic | 98 | $C_{22}H_{36}N_2O_4S$ | 62.23 | 62.17 | 8.52 | 8.49 | 105 | $C_{22}H_{36}N_2O_6S$ | 57.87 | 58.07 | 7.94 | 7.58 |
| 7 | Stearic | 97.5 | $C_{24}H_{40}N_2O_4S$ | 63.68 | 63.48 | 8.90 | 8.79 | 107 | $C_{24}H_{40}N_2O_6S$ | 59.49 | 59.59 | 8.25 | 7.98 |

[1] Yellow crystals.
[2] White crystals.

After the reaction, the contents of the bomb were treated as described in Examples 1 to 7.

The conditions of temperature, pressure and others used in the preparation of various specified primary mercaptans are set out in Table IV which follows.

The control of the purity of the mercaptans obtained and the identification of the latter was effected as described in Examples 1 to 7. The physical characteristics of the mercaptans obtained are set out in Table V. The characteristics of the crystalline derivatives of these mercaptans are the same as those given in Table III.

oleic acid with sulphur and hydrogen in the presence of rhenium heptasulphide at catalyst. The reaction was carried out at a temperature of 250–270° C. for 4 hours in a 1 litre stainless steel bomb. The reactants were used in the following proportions:

Oleic acid _____g__ 60
Sulphur _____g__ 25
Hydrogen _____l__ 45
Catalyst _____g__ 1.5

At the end of the reaction, the contents of the bomb were treated as described in Examples 1 to 7, to give a

Table IV

| Ex. | Reactants used | | Temp., °C. | Pressure (kg./cm.²) | | Time (hrs.) | Mercaptan | Yield, percent |
|---|---|---|---|---|---|---|---|---|
| | | | | Cold | Maximum | | | |
| 8 | Caproic acid, g | 40 | 270 | 45 | 120 | 4 | Hexyl | 50 |
| | H₂S, g | 20 | | | | | | |
| | Hydrogen, l | 45 | | | | | | |
| | Catalyst, g | 1.5 | | | | | | |
| 9 | Caprylic acid, g | 50 | 250–270 | 45 | 140 | 3½ | Octyl | 57 |
| | H₂S, g | 40 | | | | | | |
| | Hydrogen, l | 45 | | | | | | |
| | Catalyst, g | 1.5 | | | | | | |
| 10 | Capric acid, g | 50 | 250 | 40 | 130 | 4 | Decyl | 58 |
| | H₂S, g | 25 | | | | | | |
| | Hydrogen, l | 40 | | | | | | |
| | Catalyst, g | 1.5 | | | | | | |
| 11 | Lauric acid, g | 50 | 250 | 40 | 140 | 4 | Dodecyl | 55 |
| | H₂S, g | 34 | | | | | | |
| | Hydrogen, l | 35 | | | | | | |
| | Catalyst, g | 1.5 | | | | | | |
| 12 | Myristic acid, g | 57 | 260 | 40 | 140 | 4 | Tetradecyl | 60 |
| | H₂S, g | 25 | | | | | | |
| | Hydrogen, l | 40 | | | | | | |
| | Catalyst, g | 1.5 | | | | | | |
| 13 | Palmitic acid, g | 50 | 260 | 40 | 120 | 4½ | Hexadecyl | 54 |
| | H₂S, g | 20 | | | | | | |
| | Hydrogen, l | 40 | | | | | | |
| | Catalyst, g | 1.5 | | | | | | |
| 14 | Stearic acid, g | 70 | 260 | 40 | 140 | 3½ | Octadecyl | 61 |
| | H₂S, g | 25 | | | | | | |
| | Hydrogen, l | 40 | | | | | | |
| | Catalyst, g | 1.5 | | | | | | |

Table V

| Ex. | Starting acid | Mercaptan obtained | B.P., °C./mm. Hg | $n_D^{20}$ | Purity, percent RSH |
|---|---|---|---|---|---|
| 8 | Caproic | Hexyl | 56–8/15 | 1.4450 | 84 |
| 9 | Caprylic | Octyl | 71–5/15 | 1.4523 | 89.5 |
| 10 | Capric | Decyl | 112–3/15 | 1.4560 | 91 |
| 11 | Lauric | Dodecyl | 90–5/1.5 | 1.4580 | 83.5 |
| 12 | Myristic | Tetradecyl | 115–8/0.5 | 1.4600 | 80 |
| 13 | Palmitic | Hexadecyl | 125/0.5 | | 73 |
| 14 | Stearic | Octadecyl | 145–150/0.5 | | 83.5 |

Examples 15 and 16 are concerned with the preparation of mercaptans from an ethylenically unsaturated monocarboxylic acid.

EXAMPLE 15

Octadecyl mercaptan was prepared by the reaction of yield of 68% of octadecyl mercaptan having a boiling point of 150–155° C./0.5 mm. Hg and a purity of 82%, together with a small quantity of stearic acid (10%).

The infra-red spectrum of the product obtained was identical with that of the octadecyl mercaptan prepared from stearic acid in Examples 7 and 14. The characteristic absorption band of the ethylenic double bond had totally disappeared.

The characteristic crystalline 2,4-dinitro-(octadecylthio)-benzene derivative had a melting point of 97° C.

EXAMPLE 16

The process of Example 15 was repeated but using as the reactants, 60 g. of oleic acid, 30 g. of hydrogen sulphide, 40 l. of hydrogen and 2 g. of catalyst; a 40% yield of octadecyl mercaptan and a 30% yield of stearic acid were obtained.

Table VI

| Ex. | Reactants used | | Mercaptan obtained | Yield, percent | Characteristics of the product isolated by distillation | | |
|---|---|---|---|---|---|---|---|
| | | | | | B.P.,° C./mm. Hg | $n_D^{20}$ | Percent RSH |
| 18 | Ethanol, g | 30 | Ethyl | 53 | 34/760 | | |
| | H₂S, g | 50 | | | | | |
| | Hydrogen, l | 20 | | | | | |
| | Catalyst, g | 2 | | | | | |
| 19 | Heptanol, g | 60 | Heptyl | 33 | 77/16 | 1.4480 | 89.5 |
| | H₂S, g | 52 | | | | | |
| | Hydrogen, l | 5 | | | | | |
| | Catalyst, g | 2 | | | | | |
| 20 | Octanol, g | 65 | Octyl | 46 | 81–2/16 | 1.4475 | 80 |
| | H₂S, g | 50 | | | | | |
| | Hydrogen, l | 10 | | | | | |
| | Catalyst, g | 2 | | | | | |

EXAMPLE 17

40 g. of adipic acid, 40 g. of sulphur, 50 l. of hydrogen and 1.5 g. of rhenium heptasulphide catalyst were reacted in a 1 litre stainless steel bomb under pressure at a temperature of 260° C. for 4 hours. The treatment of the product obtained was carried out as described in Examples 1 to 7. A 30% yield of 1,6-hexanedithiol having a boiling point of 120° C./15 mm. Hg, a refractive index $n_D^{23}=1.507$ and a purity of 72.5%, was obtained.

EXAMPLES 18 TO 20

In these examples, primary mercaptans were prepared by the reaction of various alcohols with hydrogen sulphide and hydrogen in the presence of rhenium heptasulphide as catalyst. In each case, the reaction was carried out at 200° C. for about 3 hours to a 1 litre stainless steel bomb.

After the reaction, ethyl ether was added to the contents of the bomb and the mixture was filtered; the water was decanted from the filtrate and the organic layer was dried over anhydrous sodium sulphate and the ether was evaporated. The mercaptan formed was then isolated by distillation under reduced pressure. The results obtained are set out in Table VI above.

In Examples 21–25 lauryl mercaptan was prepared from lauryl alcohol.

EXAMPLE 21

60 g. of lauryl alcohol, 45 g. of sulphur, 50 l. of hydrogen and 2 g. of rhenium heptasulphide were heated in a 1 litre stainless steel bomb for 3 hours at 220° C. At the end of the reaction, ethyl ether was added to the contents of the bomb and the mixture was filtered. The water formed in the course of the reaction was decanted from the filtrate and the organic layer was dried over anyhdrous sodium sulphate and the ether was evaporated off. After distillation under reduced pressure, a lauryl mercaptan fraction (66% yield) having the following characteristics was isolated: boiling point 140° C./15 mm. Hg; $n_D^{22}=1.4560$; purity 88% (determined by iodometric estimation).

EXAMPLE 22

62 g. of lauryl alcohol, 40 g. of hydrogen sulphide, 1.5 g. of rhenium heptasulphide catalyst and 5 litres of hydrogen were heated for 3 hours at 240° C. in a 1 litre stainless steel bomb, the maximum pressure attained being 100 kg./cm.$^2$. At the end of the reaction the contents of the bomb were filtered to remove the catalyst. Water was decanted from the filtrate and the organic phase was dried over anhydrous sodium sulphate and then distilled under reduced pressure.

Four fractions were obtained by distillation; the first (10 g.) had a boiling point of 90° C. at 2 mm. Hg and consisted of dodecane; the fourth (6 g.) consisted of dodecyl sulphide; and the second and third (respectively 12 and 25 g.) having boiling points of 100° and 100–103° C. respectively, consisted of lauryl mercaptan. The yield of the reaction was 55%. The lauryl mercaptan obtained in this way had a purity of 92%.

In other experiments a product containing 96.5% of lauryl mercaptan was obtained with a yield of 60%.

When rhenium heptasulphide is used as catalyst in the process, lauryl mercaptan having a purity of 90% or more is obtained.

The purity of the lauryl mercaptan depends exclusively on the rate of conversion of the alcohol, being given that it is practically impossible to separate the alcohol from the mercaptan due to the very close boiling points of these two compounds; thus at a pressure of 15 mm. Hg, the alcohol boils at 143.5° C. and the mercaptan at 145° C.

Attempts have been made to remove the traces of alcohol by steam distillation but the distillate obtained has the same composition as the initial mixture.

Attempts have also been made to use calcium chloride which forms complexes with alcohols in order to purify the lauryl mercaptan, but such a method could not be employed on an industrial scale.

EXAMPLE 23

Example 22 was repeated but using 62 g. of lauryl alcohol, 34 g. of hydrogen sulphide and 1.5 g. of rhenium heptasulphide catalyst and omitting the hydrogen. A yield of 33% of lauryl mercaptan having a purity of 45% was obtained.

EXAMPLE 24

Example 22 was repeated but using 60 g. of lauryl alcohol, 35 g. of hydrogen sulphide and 2 g. of rhenium heptasulphide, the catalyst having previously been treated with hydrogen in an autoclave for 2 hours at 200° C. under a pressure of 30 kg./cm.$^2$. A yield of 34% of lauryl mercaptan having a purity of 52.3% was obtained.

A comparison of Examples 23 and 24 with Example 22 shows that the presence of hydrogen in the reaction medium enables a better yield of lauryl mercaptan and a final product of much greater purity to be obtained.

EXAMPLE 25

Example 22 was repeated but at a temperature of 190° C. and a pressure of about 90 kg./cm.$^2$. A yield of 76.4% lauryl mercaptan having a purity of 96.9% was obtained.

EXAMPLES 26–29

In these examples, mercaptans were prepared from aldehydes and ketones. The reactions were carried out at 200° C. for about 3 hours in a 1 litre stainless steel bomb. After the reaction, the contents of the bomb were filtered to remove the catalyst, the water was decanted and the organic phase was dried over anhydrous sodium sulphate and then distilled.

The results obtained are set out in Table VII which follows:

*Table VII*

| Ex. | Reactants used | | Mercaptan obtained | Yield, percent | Characteristics of the product isolated by distillation | | |
|---|---|---|---|---|---|---|---|
| | | | | | B.P., °C./mm. Hg | $n_D^{22}$ | Percent RSH |
| 26 | α-Methylbutyraldehyde, g. Sulphur, g. Hydrogen, l. Catalyst, g. | 50 48 70 3 | Mixture of 2-methyl-butyl and 1,2-di-methylpropyl. | 56.5 | 112–6/760 | 1.4450 | 100 |
| 27 | α-Methylbutyraldehyde, g. H$_2$S, g. Hydrogen, l. Catalyst, g. | 50 52 35 3 | ⎯⎯⎯do⎯⎯⎯ | 65 | 112–6/760 | 1.4445 | 98 |
| 28 | Methylisobutylketone, g. Sulphur, g. Hydrogen, l. Catalyst, g. | 50 48 60 2 | 1,3-dimethyl-butyl | 71 | 127.5–8/760 | 1.4415 | 98 |
| 29 | Methylisobutylketone, g. H$_2$S, g. Hydrogen, l. Catalyst, g. | 40 50 30 2 | ⎯⎯⎯do⎯⎯⎯ | 55 | 127.5–8/760 | 1.4420 | 95 |

In order to demonstrate the superiority of rhenium heptasulphide as a catalyst in the process of the present invention, two sets of tests were run comparing this catalyst to the sulphide of manganese, manganese being chosen because it is in the same group in the Periodic Table as rhenium. In the first set of tests a number of runs were made at 240° C. under the conditions of Example 22 to produce lauryl alcohol. These runs were then repeated under the same conditions except for the use of manganese sulphide as the catalyst. When rhenium heptasulphide was used as the catalyst, the yield was in the range of 55 to 60%, while when manganese sulphide was used, the yield was in the range of 48 to 52%.

In the second series of tests manganese sulphide was compared to rhenium heptasulphide at 190° C. under the conditions of Example 25. The yield of lauryl mercaptan with manganese sulphide was only 26.5% as compared with 76.4% for rhenium heptasulphide under the same conditions.

Numerous modifications of the invention may be resorted to without departing from the spirit of the invention or the scope of the appended claims.

I claim:

1. A process for the preparation of mercaptans which comprises reacting at a temperature of at least 170° C. an oxygen-containing organic compound selected from the group consisting of carboxylic acids, alcohols, aldehydes and ketones with a sulphur-containing compound selected from the group consisting of sulphur, hydrogen sulphide, carbon disulphide, calcium sulphide and ammonium sulphide, in the presence of rhenium heptasulphide as catalyst.

2. A process according to claim 1, in which the reaction is carried out at a temperature of from 170° C. to 300° C.

3. A process according to claim 1, in which the reaction is carried out under pressure with an excess of sulphur-containing compound, in the presence of hydrogen.

4. A process according to claim 1 in which the oxygen-containing organic compound is a carboxylic acid.

5. A process according to claim 4, in which the reaction is carried out at a temperature of from 250° to 270° C., under pressure.

6. A process according to claim 1, in which the oxygen-containing organic compound is an alcohol and the reaction is carried out at a temperature of from 170° to 240° C.

7. A process according to claim 1, in which the sulphur-containing compound is hydrogen sulphide.

8. A process according to claim 1, in which the sulphur-containing compound is sulphur and the reaction is carried out in the presence of hydrogen.

9. A process according to claim 5, in which the alcohol is lauryl alcohol.

10. A process according to claim 9, in which the reaction is carried out at a temperature of from 170° to 220° C.

11. A process for the preparation of mercaptans which comprises reacting a carboxylic acid with a sulphur-containing compound selected from the group consisting of sulphur, hydrogen sulphide, carbon disulphide, calcium sulphide and ammonium sulphide at a temperature of from 170° to 300° C. under pressure in the presence of rhenium heptasulphide as catalyst.

12. A process according to claim 1 in which the oxygen containing organic compound is an aldehyde.

13. A process according to claim 1 in which the oxygen containing organic compound is a ketone.

References Cited by the Examiner

UNITED STATES PATENTS 2,514,300  7/50  Laughlin _____ 260—609

FOREIGN PATENTS 454,668  10/36  Great Britain.

OTHER REFERENCES

Noddak: Z. Elektrochem. 34, 627–629 (1928), cited in Chem. Abs., 23, 7854 (1929).

CHARLES B. PARKER, *Primary Examiner.*

DANIEL D. HORWITZ, *Examiner.*